United States Patent
Katoh

[11] Patent Number: 5,970,819
[45] Date of Patent: Oct. 26, 1999

[54] OPERATING DEVICE OF OPENING-CLOSING BODY

[75] Inventor: Hideo Katoh, Kanagawa, Japan

[73] Assignee: Katoh Electrical Machinery Co., Ltd., Kanagawa, Japan

[21] Appl. No.: 09/062,954

[22] Filed: Apr. 20, 1998

[30] Foreign Application Priority Data

Apr. 21, 1997 [JP] Japan .................................. 9-103702

[51] Int. Cl.$^6$ .............................. E05C 17/00; E05C 17/64
[52] U.S. Cl. .............................. 74/531; 16/322; 16/340; 16/341; 16/303
[58] Field of Search .................... 74/55, 531; 16/340, 16/341, 342, 303, 49, 50, 338, 322, 327, 328, 319; 403/145, 146

[56] References Cited

U.S. PATENT DOCUMENTS

| | | | |
|---|---|---|---|
| 1,644,249 | 10/1927 | Harrison | 16/340 |
| 2,890,477 | 6/1959 | Miller | 16/322 |
| 3,089,184 | 5/1963 | Kerman | 16/328 |
| 3,518,716 | 7/1970 | Larson | 16/50 |
| 5,173,993 | 12/1992 | Baker | 16/329 |
| 5,317,785 | 6/1994 | Kobayashi | 16/322 |
| 5,564,772 | 10/1996 | Miller | 16/341 |

FOREIGN PATENT DOCUMENTS

| | | | |
|---|---|---|---|
| 4218253 | 12/1992 | Germany | 16/337 |
| 4212181 | 10/1993 | Germany | 16/341 |
| 6-10556 | 1/1994 | Japan | 16/341 |

*Primary Examiner*—Tamara L. Graysay
*Assistant Examiner*—William C Joyce
*Attorney, Agent, or Firm*—Notaro & Michalos P.C.

[57] ABSTRACT

An operating device of an opening-closing body is supported on both sides on a single rotating shaft and controls the turning torque of the rotating shaft. To realize the operating device, a rotating shaft having a flange portion on one side is rotatably mounted by inserting in a pair of bearing holes coaxially formed in a pair of bearing members which are erected as parallel walls at a predetermined spacing; the rotating shaft being provided with opening-closing body mounting portions on both ends which protrude out of the pair of bearing members; a friction washer is interposed between the flange portion and the bearing member and rotates together with the rotating shaft; a stationary cam member is secured on one of the bearing members, with the rotating shaft rotatably inserted through at the central part; a rotating-sliding cam member is disposed oppositely to the stationary cam member and capable of sliding in the axial direction of the rotating shaft while turning together with the rotating shaft; and furthermore a compression spring is inserted over the rotating shaft to press the rotating-sliding cam member towards the stationary cam member side to thereby press the friction washer between the flange portion and the bearing member. The compression spring can adjust a pressure to be applied to the rotating-sliding cam member and a pressure to be applied to the friction washer.

3 Claims, 5 Drawing Sheets

OPERATING DEVICE OF OPENING-CLOSING BODY

BACKGROUND OF THE INVENTION

1. Field of the Invention

The present invention relates to an operating device suitable for use in opening and closing an opening-closing body which comprises a cover body of for instance a receiver of a cellular telephone, a small laptop computer, a display unit of a word processor, and various other types of devices.

2. Description of the Prior Art

As this type of prior art operating device, various types of so-called cantilever type operating devices have been known, in which a spring, a friction washer, a cam member, etc. are mounted on a rotating shaft which is rotatably mounted on a bearing section in a mounting member, and one end portion of the opening-closing body is mounted on one end portion of the rotating shaft.

SUMMARY OF THE INVENTION

In the case of the prior art operating device, a pair of operating devices, right and left, are needed for one opening-closing body, presenting an obstacle to cost reduction of the operating device.

It is, therefore, an object of the present invention to provide an operating device for an opening-closing body which is capable of supporting the opening-closing body on both sides by a single rotating shaft, and controlling the turning torque of the rotating shaft.

To accomplish the above-described object, the present invention is comprised of a rotating shaft having a flange on one side which is rotatably mounted through a pair of right and left bearing members erected as parallel walls at a predetermined spacing; an opening-closing body mounting section provided on both ends protruding from the pair of bearing members; a friction washer interposed between the flange and the bearing member, and rotating together with the rotating shaft; a stationary cam member fixedly mounted on one of the bearing members, with the rotating shaft rotatably inserted at the center thereof; a rotating-sliding cam member disposed on the opposite side of the stationary cam member, to slide in the axial direction of the rotating shaft while rotating together with the rotating shaft; and further an elastic means for pressing the rotating-sliding cam member towards the stationary cam member side.

In this case, the elastic means may be constituted such that the elastic force of the elastic means to be applied to the rotating-sliding cam member can be adjusted by means of an adjusting nut screwed on the rotating shaft. Also, the operating device of opening-closing body of the present invention may be comprised of a mounting member having a pair of bearing members which are erected as parallel walls at a predetermined spacing; a rotating shaft which is rotatably inserted through in a pair of bearing holes having a common axial center in the bearing members of the mounting member and has a flange portion on one side, with both ends thereof protruded from the bearing holes; opening-closing body mounting portions provided on both ends of the rotating shaft; a friction washer which is interposed between a flange portion of the rotating shaft and the bearing member, and rotates together with the rotating shaft engagedly inserted in a shaft insertion hole provided at the center of the friction washer; a stationary cam member mounted by inserting the rotating shaft into the shaft insertion hole axially formed at the center thereof on the bearing member side against which the friction washer is pressed; a rotating-sliding cam member disposed on the opposite side of the stationary cam member, to be axially slidable while rotating together with the rotating shaft, with the deformed shaft portion of the rotating shaft engagedly inserted into a deformed shaft insertion hole provided axially at the center thereof; an adjusting nut threadedly mounted between the pair of bearing members on an external thread portion formed on the rotating shaft; and a compression spring inserted over the rotating shaft and disposed between the adjusting nut and the rotating-sliding cam member.

For a better understanding of the present invention as well as other objects and further features thereof reference is had to the following drawings and description.

DESCRIPTION OF THE PREFERRED EMBODIMENTS

Figure 1:
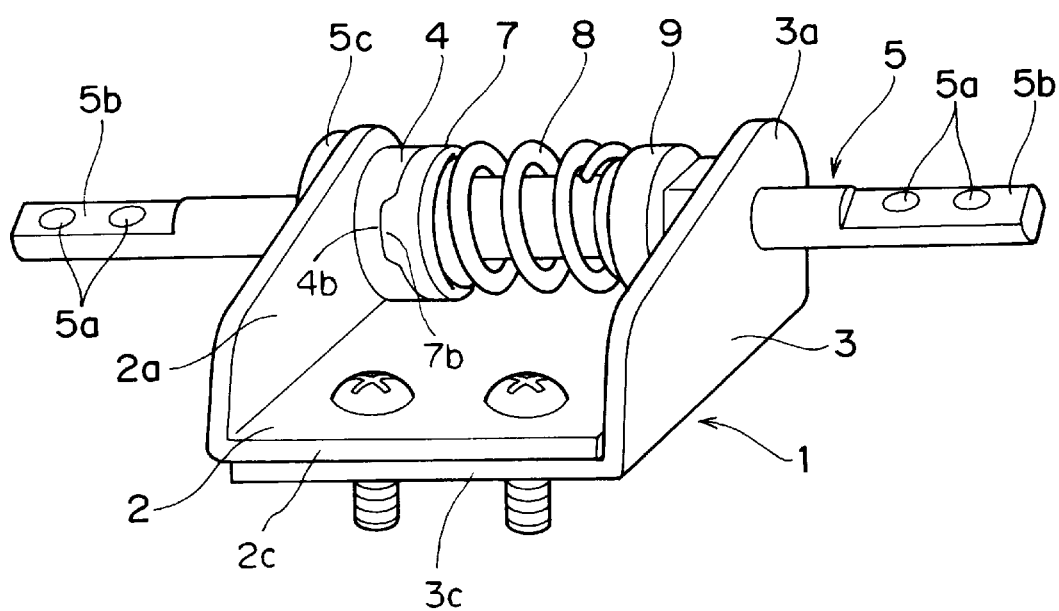
FIG. 1 is a perspective view of an operating device of an opening-closing body according to the present invention.
Figure 2:
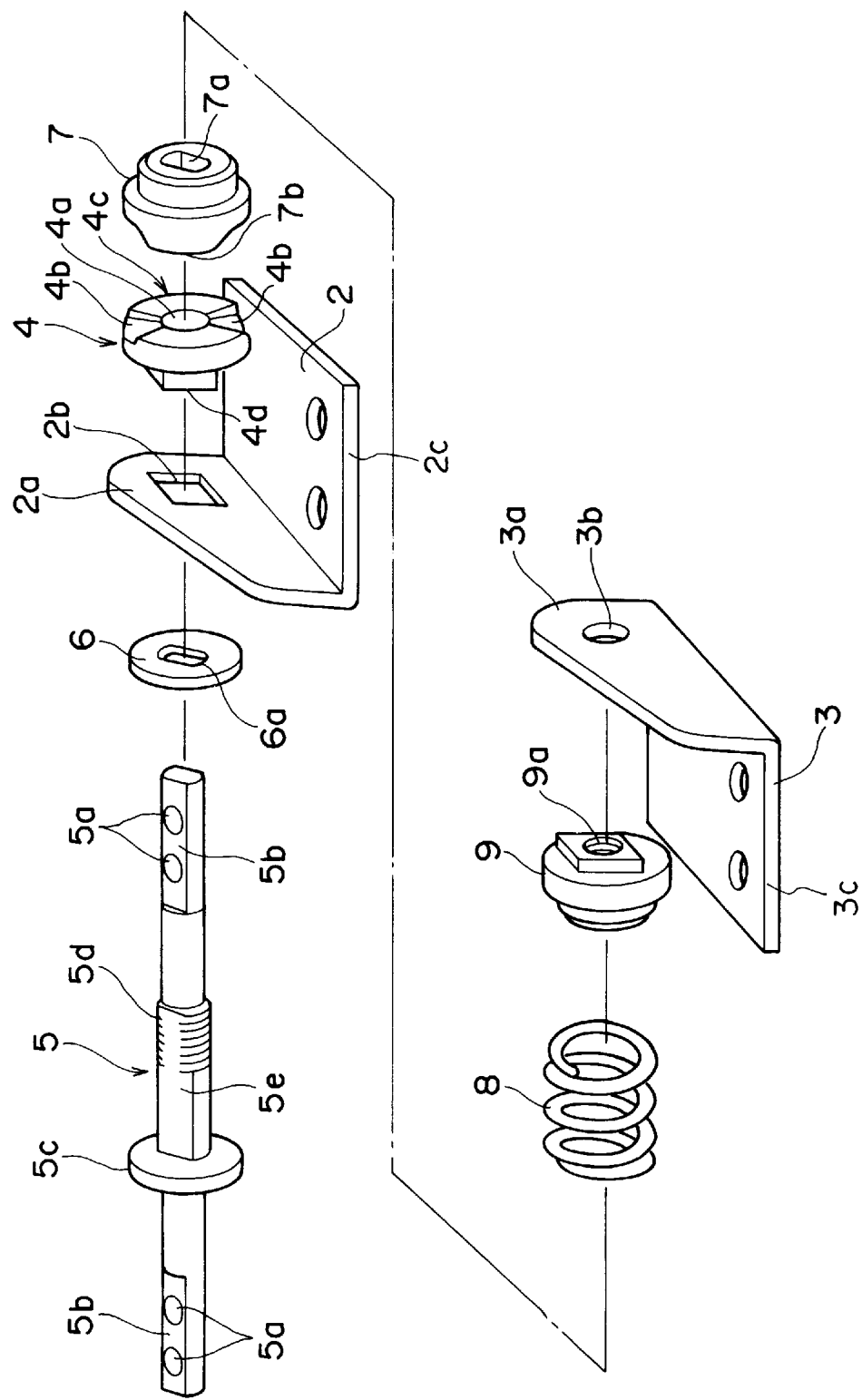
FIG. 2 is an exploded perspective view of the operating device of the opening-closing body according to the present invention.
Figure 3:
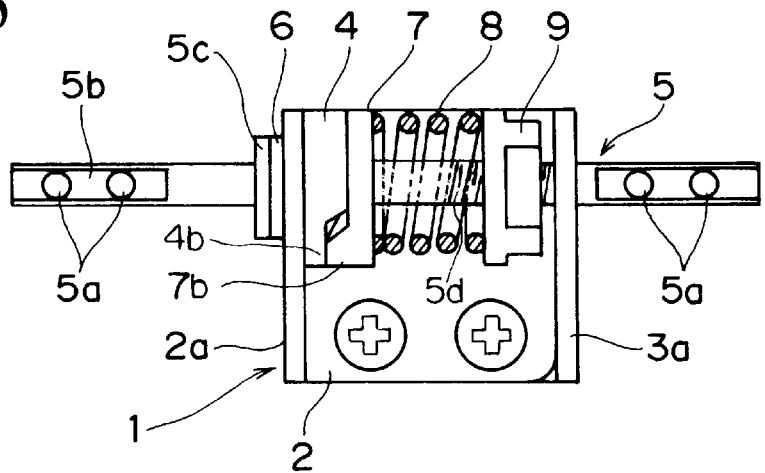
FIG. 3 is a partly sectional plan view for explaining the operation of the operating device of the opening-closing body according to the present invention.
Figure 4:
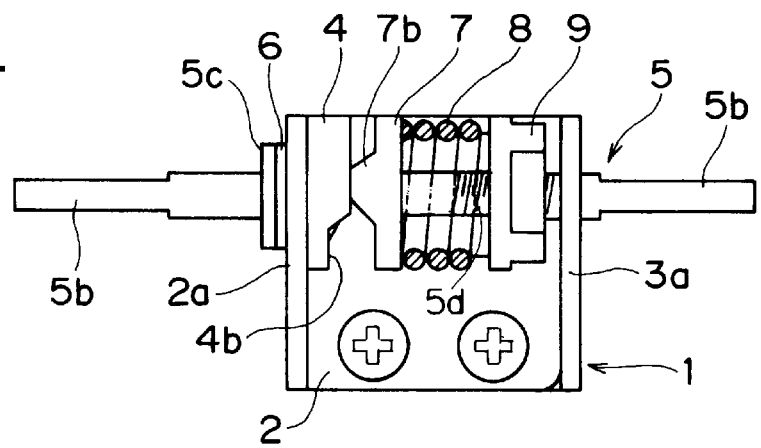
FIG. 4 is a partly sectional plan view at a changed rotational angle of the rotating shaft, for explaining the operation of the operating device of the opening-closing body according to the present invention.

The drawings show preferable embodiments of the present invention, in which numeral 1 denotes a bracket. The bracket 1 is comprised of a pair of bearing members 2 and 3, with only bearing portions 2a and 3a erected as parallel walls by bending the bearing portions 2a and 3a to an approximately L shape in cross section to form base plate portions 2c and 3c and by combining these members. The bracket may be formed of one plate material bent at only the bearing portions into an approximately U shape in cross section to erect parallel walls. Of these bearing portions, the bearing portion 2a is provided with a square hole 2b, while the other bearing portion 3a has a round bearing hole 3b. A stationary cam member 4 is provided with a round bearing hole 4a at center and further has a cam portion 4c consisting of a recess portion 4b on one side and a square projecting portion 4d on the other side. The stationary cam member 4 is mounted on the bearing portion 2a with the square projecting portion 4d inserted into the square hole 2b.

Reference numeral 5 refers to a rotating shaft. The rotating shaft 5 is provided with deformed mounting portions 5b, 5b having mounting holes 5a, 5a respectively which are formed radially through in both ends thereof, and also with a flange portion 5c on one side located on one mounting portion 5b side and furthermore with an external thread portion 5d and a noncircular or deformed shaft portion 5e nearly at the central section. The rotating shaft 5 is rotatably mounted between the bearing portion 2a of the bearing member 2 and the bearing portion 3a of the bearing member 3, through in the bearing hole 4a of the stationary cam member 4 on one side and the bearing hole 3b of the bearing portion 3a on the other side. The mounting portions 5b, 5b provided on both ends are protruded outwardly of the bearing portions 2a and 3a.

Numeral 6 refers to a friction washer interposed between one side face of the bearing portion 2a and a flange portion 5c of the rotating shaft 5. The friction washer 6 is made of a synthetic resin plate or a phosphor bronze metal plate. The friction washer 6 is provided with a deformed insertion hole 6a at the central part, through which a deformed shaft portion 5e of the rotating shaft 5 is inserted, so that the friction washer may turn together with the rotating shaft 5.

Numeral 7 denotes a rotating-sliding cam member having a noncircular or deformed insertion hole 7a at the central part and a protruding cam portion 7c consisting of a projecting portion 7b on the side opposite to the recessed portion 4b of the stationary cam member 4. In the deformed insertion hole 7a the deformed shaft portion 5e of the rotating shaft 5 is inserted, so that the rotating-sliding cam member can slide in the axial direction thereof while turning together with the rotating shaft 5.

Numeral 8 is an elastic means consisting of a compression spring, which is inserted over the rotating shaft 5 for the purpose of pressing to slide the rotating-sliding cam member 7 towards the stationary cam member 4. The elastic means 8 may be replaced with a plate spring, a spring washer, or a rubber plate.

Numeral 9 denotes an adjusting nut including an internal thread portion 9a provided in the axial direction of the central part thereof threadedly engaged with the external thread portion of the rotating shaft 5, and having a function to adjust the elastic force of the elastic means 8. An unillustrated lubricating material such as silicone grease is applied between the friction washer 6 and the bearing portion 2a and between the contact surfaces of the rotating-sliding cam member 7 and the stationary cam member 4.

Figure 5:
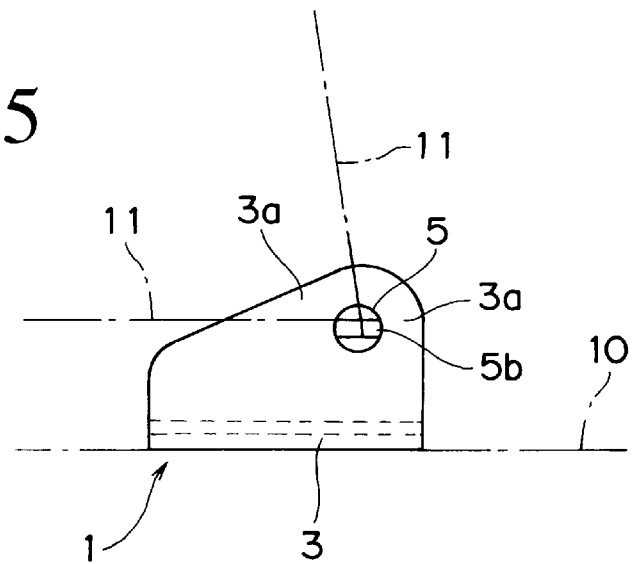
FIG. 5 is a side view of the operating device of the opening-closing body according to the present invention.
Figure 6:
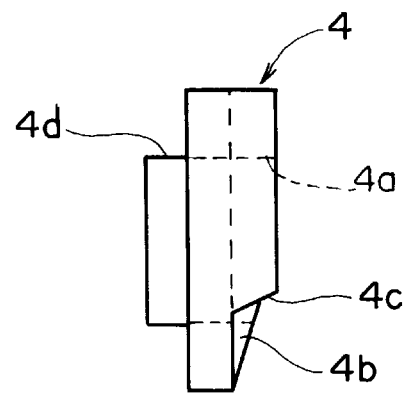
FIG. 6 is a front view of a stationary cam member.
Figure 7:
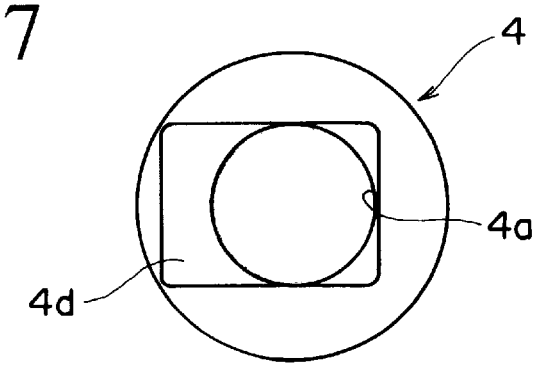
FIG. 7 is a left side view of the stationary cam member.
Figure 8:
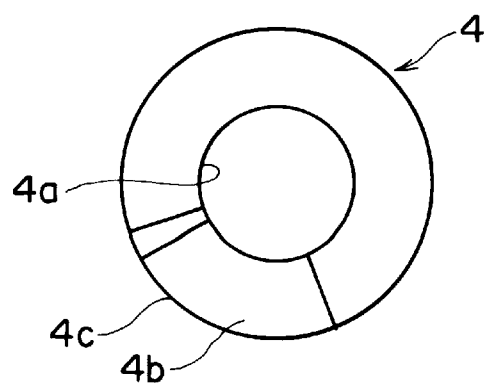
FIG. 8 is a right side view of the stationary cam member.
Figure 9:
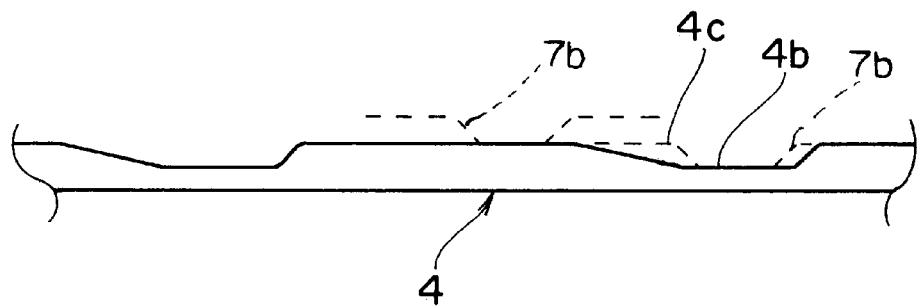
FIG. 9 is a development of a cam portion of the stationary cam member.
Figure 10:
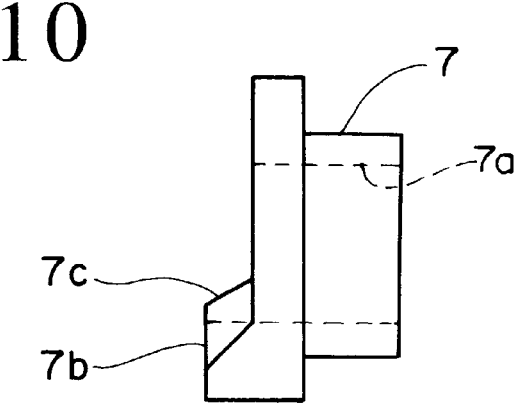
FIG. 10 is a front view of a rotating-sliding cam member.
Figure 11:
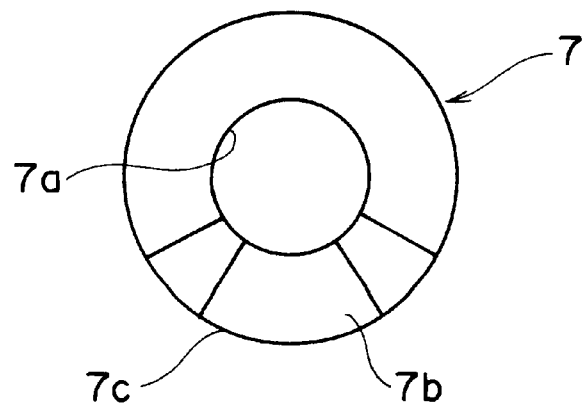
FIG. 11 is a right side view of the rotating-sliding cam member.

Therefore, as shown in FIG. 5, the bracket 1 is secured on the device body 10 side (indicated by an imaginary line) where for instance a transmitter side of a cellular telephone or a keyboard of an office automation system is set; the opening-closing body 11 (indicated by an imaginary line) is attached to the mounting portions 5b, 5b on both ends of the rotating shaft 5. With the opening or closing operation of the opening-closing body 11, the rotating shaft 5 turns together with the opening-closing body 11. At this time, it is possible to control the opening and closing operation of the opening and closing body 11, for example to stop and hold the opening-closing body 11 with stability at a predetermined or arbitrary intermediate opening angle by a cam torque generated between the cam portion 4c of the stationary cam member 4 and the cam portion 7c of the rotating-sliding cam member 7 and by a friction torque generated between the friction washer 6 and the bearing portion 2a, or to prevent sudden drop of the opening-closing body 11, or to automatically close the opening-closing body 11 with so-called "sink" from a predetermined closing angle.

Cam torque and friction torque can be adjusted by turning the adjusting nut 9 in either direction to adjust a pressure required to press the rotating-sliding cam member 7 against the stationary cam member 4 and also a pressure required to press the friction washer 6 against the bearing portion 2a. It is to be noted that the shape, location and mounting angle of the cam portions 4c and 7c of the stationary cam member 4 and the rotating-sliding cam member 7 are not limited to those of the above-described embodiment, and can be changed according to requirements of the opening and closing body to be controlled.

Although a preferred embodiment of the present invention has been illustrated and described herein it will be understood that the invention is susceptible to various modifications and adaptations without departing from the spirit and scope of the invention.

What is claimed is:

1. An operating device of an opening-closing body, comprising: a rotating shaft having a flange portion on one side and rotatably mounted in a pair of bearing holes coaxially formed in a pair of bearing members which are erected as parallel walls at a predetermined spacing; said rotating shaft being provided with opening-closing body mounting portions on both ends which protrude out of said pair of bearing members; a friction washer interposed between said flange portion and one of said bearing members and rotating together with said rotating shaft; a stationary cam member secured on said one of said bearing members, with said rotating shaft rotatably extending through a central part of said stationary cam member; a rotating-sliding cam member disposed opposite to said stationary cam member and sliding in the axial direction of said rotating shaft while turning together with said rotating shaft; a stop on said rotating shaft; and a compression spring inserted over said rotating shaft and between said rotating-sliding said stop, said spring pressing said rotating-sliding cam member towards said stationary cam member and pressing rotating shaft in an axial direction to thereby press said friction washer between said flange portion and said bearing member.

2. An operating device of an opening-closing body, comprising: a rotating shaft having a flange portion on one side and rotatably mounted in a pair of bearing holes coaxially formed in a pair of bearing members which are erected as parallel walls at a predetermined spacing; said rotating shaft being provided with opening-closing body mounting portions on both ends which protrude out of said pair of bearing members; a friction washer interposed between said flange portion and one of said bearing members and rotating together with said rotating shaft; a stationary cam member secured on said one of said bearing members, with said rotating shaft rotatably extending through a central part of said stationary cam member; a rotating-sliding cam member disposed opposite to said stationary cam member and sliding in the axial direction of said rotating shaft while turning together with said rotating shaft; a stop on said rotating shaft; a compression spring inserted over said rotating shaft to press said rotating-sliding cam member towards said stationary cam member to thereby press said friction washer between said flange portion and said bearing member; and adjusting means for adjusting an axial position of the stop on the shaft for adjusting a pressure to be applied to said rotating-sliding cam member and a pressure to be applied to said friction washer by said compression spring.

3. An operating device of an opening-closing body, comprising: a mounting member having a pair of bearing members erected as parallel walls at a predetermined spacing; a rotating shaft having a flange portion on one side and rotatably mounted in a pair of bearing holes coaxially formed in said pair of bearing members, said rotating shaft protruding out of said pair of bearing members; an opening-closing body mounting portion provided on both ends of said rotating shaft; a friction washer mounted between said flange portion of said rotating shaft and one of said bearing members, and turning together with said rotating shafts; said rotating shaft extending in an insertion hole at a central part of the friction washer; a stationary cam member disposed on said one of said bearing members against which said friction washer is pressed, with said rotating shaft extending in a shaft insertion hole at a central part of said stationary cam member; a rotating-sliding cam member disposed opposite to said stationary cam member, said rotating shaft having a noncircular portion engaged in a noncircular shaft insertion hole in a central part of said rotating-sliding cam member, to thereby turn together with said rotating shaft while axially sliding; an adjusting nut threaded on an external thread portion on said rotating shaft between said pair of bearing members; and a compression spring inserted over said rotating shaft between said adjusting nut and said rotating-sliding cam member for pressing said friction washer against said flange portion and for pressing said rotating-sliding cam member against said stationary cam member.

* * * * *